UNITED STATES PATENT OFFICE.

WALTER H. DICKERSON, OF MUSKEGON, MICHIGAN, ASSIGNOR TO TANNING EXTRACT COMPANY, OF NEW YORK, N. Y., A CORPORATION OF NEW YORK.

PROCESS OF TREATING WASTE SULFITE LIQUOR.

1,043,303.  Specification of Letters Patent.  Patented Nov. 5, 1912.

No Drawing.  Application filed May 25, 1909.  Serial No. 498,304.

*To all whom it may concern:*

Be it known that I, WALTER H. DICKERSON, a citizen of the United States of America, residing at Muskegon, in the county of Muskegon and State of Michigan, have invented certain new and useful Improvements in Processes of Treating Waste Sulfite Liquor, of which the following is a specification, reference being had therein to the accompanying drawing.

The object of my invention is to produce a tanning extract from waste sulfite liquors. When these are treated in accordance with the hereinafter described invention, a tanning extract which will tan perfectly white or nearly white results.

By the preferred treatment I take waste sulfite liquor, either as it comes from the digesters or preferably after it has been concentrated *in vacuo* to a consistency say of about 25° Baumé, and add thereto chlorid of sodium or a similar salt to the extent of about 10 to 25% by weight of the concentrated liquor. This addition of salt should be made preferably in a grinding or crushing apparatus, in which the salt in a finely pulverized state is mixed very intimately with the liquor. The liquor soon gelatinizes into a thick, heavy, pasty mass, which becomes quite solid upon standing a few hours. Upon standing for a longer period, say from 24 to 48 hours, it changes from a dark to a light color and loses its thick, solid nature becoming of a much thinner consistency. Upon adding water it will be found that this light colored mass of thin consistency has entirely taken up the salt which is either combined with or dissolved in the evaporated liquor. Of course, there are certain limits within which the proportion of salt to be added may be varied, and wherein the described effect will be obtained. With the higher proportions of salt named, a tanning extract is produced which gives white leather, whereas the smaller proportions of salt produce leather which is not so light in color. 10% of salt is sufficient to make the liquor available as a tanning extract but does not invariably produce as light a colored leather as higher percentages. It requires from 20 to 25% to invariably produce white or nearly white tannage with pickled skins.

When the salt is added, as is preferable, to waste sulfite liquors which have been previously concentrated, the resulting light-colored mass requires the addition of waste in order to make it suitable for use as a tanning extract. It is economical and advantageous to ship the product in this concentrated condition, and it is afterward diluted with water to bring it to the proper specific gravity for tanning. The dilution with water will be in such proportion as to bring the resulting extract to a density of 2 to 3° Baumé; and the proportion in which water will have to be added for this purpose will be approximately one part of water to three or four parts of concentrated, treated liquor. When the water is added and the whole mass is intimately commingled, a certain amount of gas is evolved. The extract so obtained has been found to be particularly adapted to the tanning of pickled skins. Other salts or compounds, such for instance as calcium chlorid, potassium chlorid or magnesium chlorid, which produce similar effects when added to the liquors, may be used; but up to the present time, common salt or sodium chlorid has been found to give the best results and to be most practical commercially. My invention includes, broadly considered, the use of any electrolyte which will produce similar effects to those previously herein described as attained by the use of sodium chlorid, and I do not confine myself to the use of this salt or of any other of the salts mentioned either singly or in combination.

I have found that when two to three parts of the thick tanning extract produced by this process are mixed with one part of the thin unevaporated liquor made by the use of oxalic acid or of a similar non-decomposing precipitant for lime the combined liquor possesses decided plumping properties and gives a soft leather. These proportions may be varied and I instance it simply as an example.

The tanning extracts obtained by the procedure first described are particularly suitable for retanning previous to dyeing, in which case qualities are imparted to the skins which are similar to those obtained by a mordant or to those of skins which have been treated to a color-bottom.

When the tanning material is prepared by the latter procedure it is particularly adapted to the tanning of green skins. I have found, also, that by using a thin, unevaporated liquor which has been treated with chrome alum instead of oxalic acid, the same results, or practically the same, will be produced. The tanning agent thus made also imparts a plump dense quality to the leather, and at the same time makes it soft and flexible.

I am unable to definitely state the reactions that take place in any of these combinations, owing to the complicated nature of the sulfite liquors.

As I have already stated, I prefer to add the salt to the waste liquors after the same have been concentrated. But such addition can be made to the liquors as received from the digesters, and in relatively the same proportion as that hereinbefore set forth, whereupon the mixture may then be evaporated down to the aforesaid consistency of say 25° Baumé, if desired, for shipment. When the salt or an equivalent compound is thus added to the thin unconcentrated liquor it does not, of course, change into a thick pasty mass and later to a lighter colored mass of thin consistency unless it is concentrated. The thin liquors, however, clear up somewhat, and gas, apparently sulfur dioxid, is evolved.

Instead of waiting the specified period of 24 to 48 hours, the hereinbefore described effects can be quickly attained by subjecting the salted concentrate to a slight elevation of temperature. There is thus produced a tanning extract in a minimum of time, having substantially the same property as that slowly developed as before described. The digestion with the salt, as I prefer to term it, may, therefore, occur while the liquors are hot or cold.

The tanning extracts produced by this process are found, when applied to hides previously plumped with sulfuric acid, to preserve a very large percentage of said plumping and to produce a light-colored, soft and flexible leather.

Having thus described my invention, what I claim as new and desire to secure by Letters Patent, is:—

1. In the manufacture of tanning extracts from waste sulfite liquor, the admixture and digestion of the liquor with a sufficient quantity of an electrolyte capable of gelatinizing the liquor when concentrated.

2. In the manufacture of tanning extracts from waste sulfite liquor, the admixture and digestion of the liquor with a sufficient quantity of an electrolyte capable of converting it, when concentrated, to a light-colored mass of thin consistency.

3. In the manufacture of tanning extracts from waste sulfite liquor, the admixture and digestion of the liquor with a sufficient quantity of sodium chlorid to gelatinize the liquor when concentrated.

4. In the manufacture of tanning extracts from waste sulfite liquor, the admixture and digestion of the liquor with a sufficient quantity of sodium chlorid to convert it, when concentrated, to a light-colored mass of thin consistency.

5. In the manufacture of tanning extracts from waste sulfite liquor, the admixture and digestion of the liquor with a sufficient quantity of an electrolyte capable of converting it, when concentrated, to a light-colored mass of thin consistency, and the later addition thereto of a thin tanning extract made by the addition of a non-decomposing precipitant for lime to waste sulfite liquor.

6. A tanning extract obtained from waste sulfite liquor which consists of a light-colored mass of thin consistency when concentrated to a specific gravity of about 25° Baumé.

In testimony whereof I affix my signature in presence of two witnesses.

WALTER H. DICKERSON.

Witnesses:
C. B. SCHROEDER,
R. G. DuBois.